United States Patent [19]

Igel

[11] 4,219,231
[45] Aug. 26, 1980

[54] VEHICLE ROOF WITH ROOF OPENING CLOSABLE BY A COVER

[75] Inventor: Richard Igel, Germering, Fed. Rep. of Germany

[73] Assignee: Webasto-Werk W. Baier GmbH & Co., Fed. Rep. of Germany

[21] Appl. No.: 933,542

[22] Filed: Aug. 14, 1978

[30] Foreign Application Priority Data

Aug. 12, 1977 [DE] Fed. Rep. of Germany ....... 2736459

[51] Int. Cl.² .............................................. B60J 7/08
[52] U.S. Cl. ..................................... 296/218; 292/8; 292/DIG. 5; 292/277; 292/278; 296/224
[58] Field of Search ....................... 296/137 B, 137 H; 49/394; 292/8, 31, DIG. 5, 262, 277, 278

[56] References Cited

U.S. PATENT DOCUMENTS

| | | | |
|---|---|---|---|
| 4,005,901 | 2/1977 | Lutke et al. ........................ | 296/137 B |
| 4,118,063 | 10/1978 | Bienert et al. ..................... | 296/137 B |
| 4,126,352 | 11/1978 | Vogel ................................ | 296/137 B |

Primary Examiner—Robert R. Song
Attorney, Agent, or Firm—Craig & Antonelli

[57] ABSTRACT

An improved locking arrangement for a vehicle body member with an opening, a tiltable and removable cover for closing the opening which is swivelable in the vicinity of a front edge and has a tilting mechanism near its rear edge and connected with the cover is formed by first locking elements which are so disposed and designed that they are releasable only from inside the vehicle, even when the cover is tilted, and second locking elements which are releasable only from the outside of the vehicle when the cover is tilted. According to a preferred embodiment, the first locking elements are provided laterally next to the tilting mechanism on both sides thereof and are shielded by walls both laterally and below, while a preferred arrangement for the second locking elements includes a hook engageable with a locking surface which is so disposed that the hook latches rearward of the first locking elements.

12 Claims, 6 Drawing Figures

VEHICLE ROOF WITH ROOF OPENING CLOSABLE BY A COVER

BACKGROUND AND SUMMARY OF THE INVENTION

The invention relates to a vehicle roof with a roof opening, closable by a tiltable and removable cover, said cover being swivelable in the vicinity of its forward edge about an axis running at right angles to the lengthwise axis of the vehicle, the rear edge of said cover being tiltable by a tilting mechanism, said mechanism being disposed on the vehicle roof and connected to the cover by at least one locking element releasable by finger pressure.

A vehicle roof of this kind is known for example from previously published German Offenlegungsschrift No. 2,645,288, which does not anticipate this invention. In this known vehicle roof, means are provided to allow the locking means to be released from outside with the cover tilted, so that unauthorized persons can remove the cover and enter the vehicle if the cover is left tilted when the vehicle is parked. Moreover, inadvertent release of the locking elements while driving can allow the cover to fly off. Hence, this roof is unsatisfactory as far as the degree of safety required is concerned.

The present invention is intended to provide a vehicle roof of the type described hereinabove such that its cover cannot be removed by unauthorized persons, i.e., when the doors and windows are closed and locked, nor can it fly away while driving through inadvertent release of the locking elements.

This goal is achieved according to the invention by virtue of the fact that the locking elements are so disposed and designed that they are releasable only from inside even when the cover is tilted, and by the fact that a hook is provided, releasable from outside only when the cover is tilted, said hook connecting the cover to the roof when it is in its locked position.

The proposal according to the invention ensures that the cover can only be removed after the locking elements have been released from inside and the hooks have been removed from their locked position from outside. Since the locking elements are not accessible when the doors and windows are closed and locked, the tilted cover cannot be removed from outside even after releasing the hooks. On the other hand, the hook is not accessible from the interior of the vehicle, so that the cover cannot fly away even if the locking elements are inadvertently released while in motion, for example by children at play, since it is gripped by the hook.

Preferably, the hooks have their locking surfaces and locking elements arranged in such manner that the hook engages in front of the locking elements. If a passenger in the vehicle wishes to remove the cover, he must first release the locking elements from the interior of the vehicle and push the cover out of the locking mechanism. Then he must get out and release the hook from the outside; only then can he remove the cover. Hence, it is not necessary for one person to release the locking element on the inside and a second person to release the hook from its locking position on the outside.

The hook and a spring which forces it into its locking position must be made so that the hook is forced into its locking position by the weight of the cover alone. This measure ensures that the cover is permanently connected to the vehicle even if it is not pushed down sufficiently, through negligence, for the locking elements to engage.

In an embodiment in which the locking element consists of two components releasably engaged with one another, the first being disposed on the cover and the second on the tilting mechanism, the hook is provided on the first part of the locking element fastened to the cover, and fits behind a locking surface on the second part in its engaged position. This allows a handle to be used to release the hook and remove the cover. The hook can be mounted on a pin which simultaneously serves as a guide for a spring of a locking element. This eliminates additional fastening elements for the hook.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
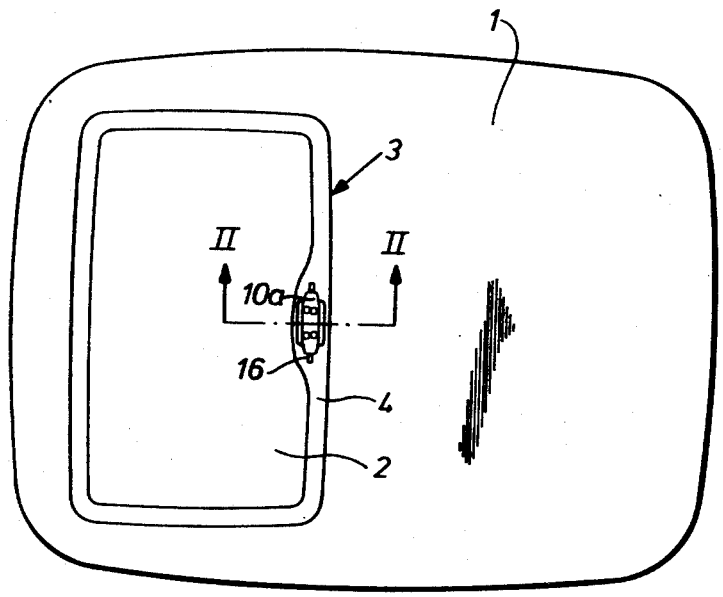
FIG. 1 is a top view of a vehicle roof with the cover removed.

As is evident in FIG. 1, a rectangular roof opening 2 is provided in vehicle roof 1, said opening being surrounded by a roof frame 3, forming a gutter 4. Roof opening 2 is normally closed by a cover 5 (FIG. 2), said cover being fastened in the vicinity of its forward edge to roof frame 3 in a swivelable manner, and is tiltable at its rear edge 6 by means of a tilting mechanism in the form of a telescoping screw 7. In order to be able to remove cover 5 completely, the swiveling connection between the leading edge of cover 5 and roof frame 3 is designed to be releasable, for example as a plug-in connection, provided with two tabs projecting forward from the leading edge of the cover, said tabs engaging corresponding slots in the vertical forward wall of roof frame 3, as shown in principle and described in German Offenlegungsschrift No. 2,645,288. Telescoping screw 7 is likewise fastened releasably to cover 5, as will be described in detail hereinbelow.

Telescoping screw 7 consists of a first threaded part 8 with an outside thread 9, and a second threaded part 10 with an inside thread 11 and a third threaded part 12 with an inside thread 13 and an outside thread 14, said thread 13 engaging outside thread 9 of threaded part 8 and said thread 14 engaging inside thread 11 of threaded part 10. First threaded part 8 is rotatable, but mounted nondisplaceably in roof frame 3, and is provided with a handwheel 15, whose rotation extends and retracts the telescoping screw. Threaded part 10 is connected swivelably and by means of releasable locking elements to cover 5. For this purpose, threaded part 10 is provided with a cover plate 10a with two pins 16 extending diametrally opposite one another, said pins being capable of engaging a groove 17 of a manually actuatable locking element 18, fastened by a bearing housing 19 to cover 5 and capable of being pushed back against the action of a spring 20 in order to release pin 16.

As is evident, catch 18 is disposed on the side of the tilting mechanism which faces the interior of the vehicle, and is covered laterally as well as below by walls 21, 22, so that it cannot be actuated from the outside even when the cover is tilted.

Figure 4A:
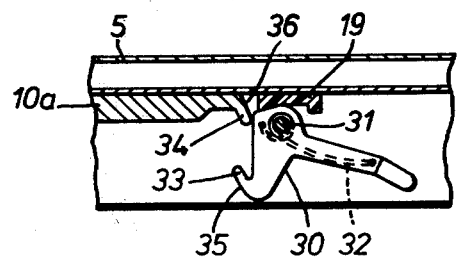
FIG. 4a is a cross section along Line IV—IV in FIG. 3.
Figure 4B:
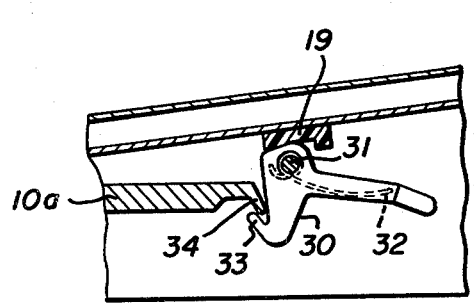
FIG. 4b corresponds to FIG. 4a when in the dot dashed position.
Figure 4C:
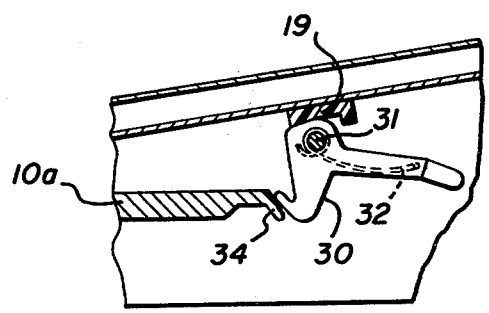
FIG. 4c corresponds to FIG. 4a when both locking arrangements are disengaged.

In order to prevent the cover from flying away if catch 18 is inadvertently released from inside, a hook 30 is provided which is mounted rotatably on a pin 31, which guides spring 20 of catch 18. Hook 30 is under the influence of a spring 32 which tends to push it into the locking position. In this locking position, hook 30 with its nose 33 fits behind a projection 34 on plate 10a, which supports pin 16 and is connected to threaded part 10. Hook 30 is so disposed that it can be released from the tilted cover only from outside. Outside surface 35 of its nose 33 is so constructed, and spring 32 is so designed, that hook 30 can be brought from its position resting against surface 36 (FIG. 4c),, to its locking position (FIG. 4b) by the weight of cover 5 alone. When cover 5 is put in place, projection 34 presses on the outside 35 of nose 33, whereby hook 30 is swiveled against the action of spring 32 until nose 33 passes and can latch behind projection 34. In this position, pins 16 are in the position (i.e., when nose 33 is latched behind projection 24 as in FIG. 4b) 16' shown by the dot-dashed lines in FIG. 2. Pins 16 push catch 18 back against the action of springs 20 when cover 5 is pushed down further, so that pins 16 can then enter grooves 17 and hook 30 is brought to its resting position (FIG. 4a).

Figure 2:
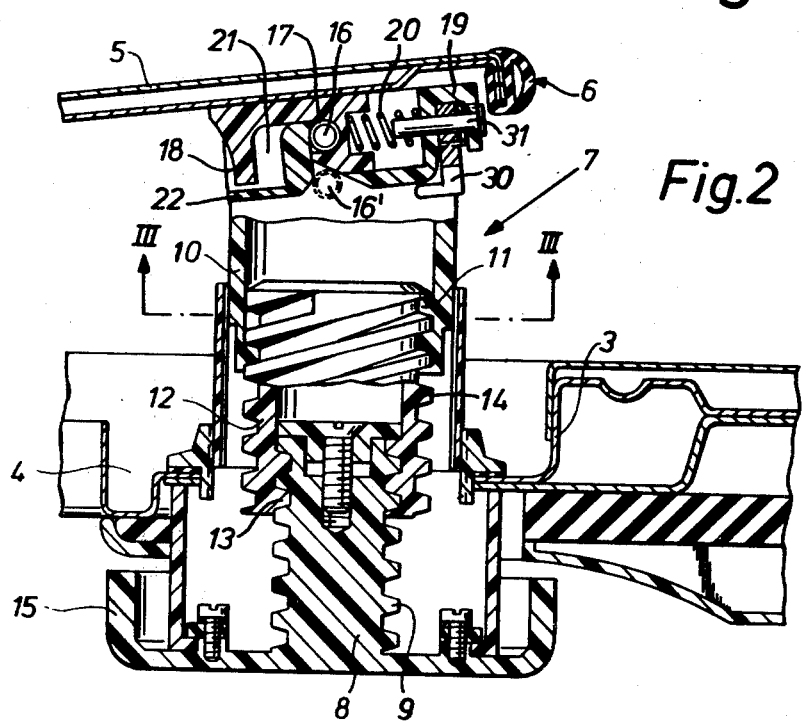
FIG. 2 is a cross section along Line II—II on an enlarged scale, whereby the cover is shown in its tilted position.
Figure 3:
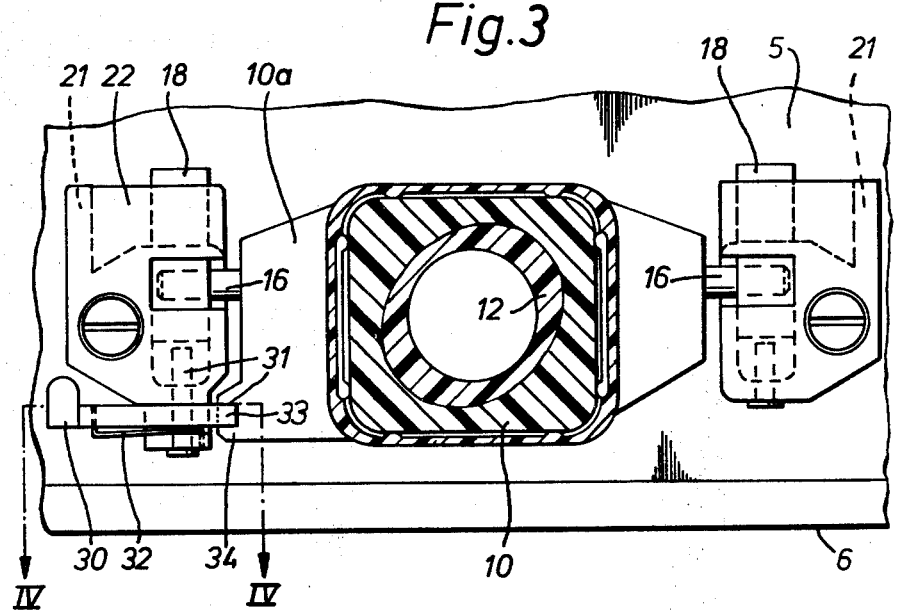
FIG. 3. is a cross section along Line III—III in FIG. 2.

To remove cover 5, catch 18 is first pushed in on the inside and cover 5 is raised until pins 16 have reached position 16' in FIG. 2. Cover 5 cannot be lifted any further because of hook 30. Then the user must push on hook 30 from outside, thus releasing the lock and cover 5 can then be removed.

The fact that catch 18 can be actuated only from inside and hook 30 can be actuated only from outside prevents both an inadvertent release of the cover from the inside as well as unauthorized release of the cover from outside.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. In a vehicle body member with an opening, a tiltable and removable cover for closing said opening, said cover being swivelable in the vicinity of a front edge about an axis running at right angles to the lengthwise axis of the cover, a tilting mechanism near the rear edge for tilting said cover about said axis, said tilting mechanism being mounted on the vehicle body member and connected with the cover by a locking arrangement, the improvement comprising said locking arrangement including first locking elements so disposed and designed that they are releasable only from inside the vehicle, even when said cover is tilted, and second locking elements releasable only from outside vehicle when the cover is tilted.

2. A vehicle body member according to claim 1, characterized in that second locking elements include a hook engagable a locking surface, said first locking elements being so disposed that the hook latches rearward of said first locking elements.

3. A vehicle body member according to claim 2, characterized by the fact that the hook is biased by a spring into its locking position, said hook and spring being so designed that the hook reaches its locking position under the influence of the weight of cover alone.

4. A vehicle body member according to one of claims 1 or 3 wherein the second locking element consists of two parts connected releasably with one another, the first of said parts being mounted on the cover and the second on the tilting mechanism.

5. A vehicle body member according to claim 4, characterized by the fact that the first locking elements are provided laterally next to the tilting mechanism on both sides thereof, said said first locking elements being provided with a catch said catch being movable rearward in the lengthwise direction of the vehicle against a spring 20, and wall means being provided for covering the catch laterally and, below for limiting access to said catch from the outside of said vehicle.

6. A vehicle body member according to claim 5, characterized by the fact that said second lock elements include a hook mounted on a pin and engagable with a surface located rearward of said first locking elements, said pin simultaneously serving as a guide for said spring of the catch of said first locking elements.

7. A vehicle body member according to claim 1, characterized by the fact that the first locking elements are provided laterally next to the tilting mechanism on both sides thereof, said said first locking elements being provided with a catch said catch being movable rearward in the lengthwise direction of the vehicle against a spring, and wall means being provided for covering the catch laterally and, below for limiting access to said catch from the outside of said vehicle.

8. A vehicle body member according to claim 7, characterized by the fact that the first locking elements are provided laterally next to the tilting mechanism on both sides thereof, said said first locking elements being provided with a catch said catch being movable rearward in the lengthwise direction of the vehicle against a spring, and wall means being provided for covering the catch laterally and, below for limiting access to said catch from the outside of said vehicle.

9. A vehicle body member according to claim 1 or 3 wherein said opening is formed in a vehicle roof.

10. A vehicle body member according to claim 6 wherein said opening is formed in a vehicle roof.

11. A vehicle body member according to claim 8 wherein said opening is formed in a vehicle roof.

12. A vehicle body member according to claim 1, wherein both of said first and second locking elements are constructed to be manually releasable by finger pressure.

* * * * *